United States Patent Office 3,427,523
Patented Feb. 11, 1969

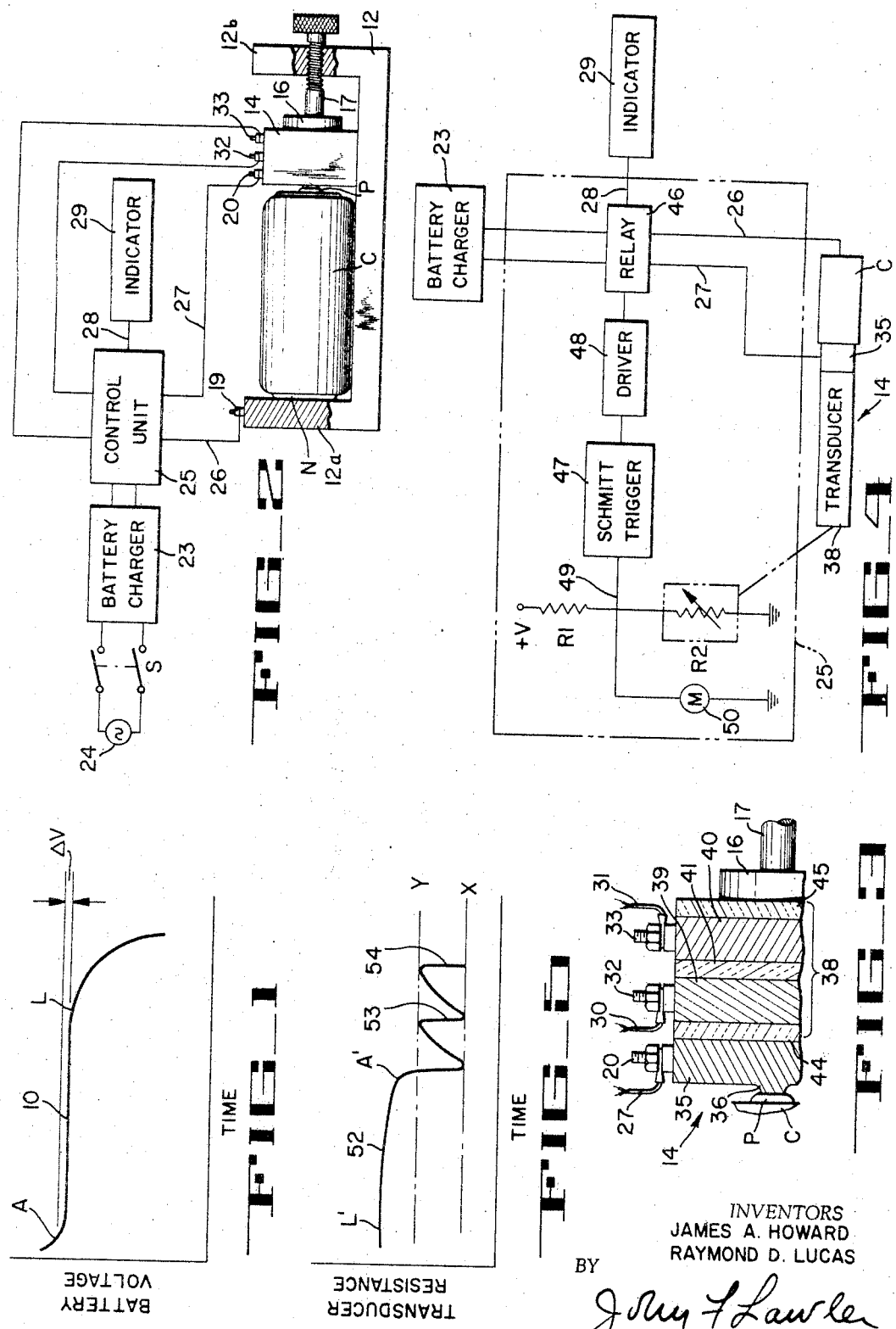

3,427,523
PRESSURE RESPONSIVE BATTERY CHARGING APPARATUS
James A. Howard and Raymond D. Lucas, Mountain View, Calif., assignors to Sylvania Electric Products Inc., a corporation of Delaware
Filed Aug. 1, 1966, Ser. No. 569,353
U.S. Cl. 320—46
Int. Cl. H02j 7/04, 7/16
3 Claims

ABSTRACT OF THE DISCLOSURE

Apparatus for charging a standard rechargeable secondary cell comprises a U-shaped jig or support within which a transducer-terminal block and the cell to be charged are adapted to be releasably clamped. One electrical contact of the cell abuts a fixed wall on the support and the other cell contact engages the terminal side of the block. A source of charging current is connected through a control circuit to the support wall and to the block terminal for charging the cell. The transducer is electrically connected to the control circuit which cuts off charging current to the cell when internal pressure in the latter produces a force of predetermined magnitude against the transducer.

---

This invention relates to battery charging apparatus and more particularly to charging apparatus for sealed nickel-cadmium cells.

The sealed nickel-cadmium cell has several advantages which ideally suit it as a power source in portable equipment. A principal feature is rechargeability over many cycles of use. Other features are a nearly constant discharge voltage, superior charge retention and no maintenance other than charging. The sealed cell also prevents discharge of corrosive or explosive fumes or gases which are generated within the cell during the final stage of the charge cycle and during overcharge. However, care must be exercised to prevent an excessive buildup of gas within the cell during charging since permanent damage to the cell including ruptured seals or a burst casing may result.

Because the discharge voltage of the nickel-cadmium cell is nearly constant, there is difficulty in identifying the time in the charge cycle when the cell comes up to full charge. This is an especially difficult determination if the state of charge of the cell, i.e., whether it is partially or fully discharged, is unknown at the start of the charging cycle. If the rate of cell charging is low, called a "trickle charge," the rate of generation of gases on overcharge is sufficiently low that these gases are absorbed or recombined within the cell and do not produce a dangerous pressure. This charge rate, however, is too slow for most purposes. Attempts have been made to provide sealed cells with venting mechanisms designed to operate when the internal cell pressure reaches a predetermined level but these have met with only limited success. In one construction, the top cell seal is a puncturable diaphragm which distends under excess pressure until punctured to vent the gases. However, this cell, after diaphragm puncture, ages at a faster rate than does the fully sealed cell.

Even though venting provides control of the pressure developed by overcharge gases in the cell, it introduces the hazard of corrosive fumes and explosive gas in the vent space so as to limit the utility of the cell.

An object of this invention is the provision of battery charging apparatus for sealed nickel-cadmium cells which permits fast recharging of the cells without the danger of bursting or otherwise damaging the cells from excessive internal gas pressure.

Another object is the provision of battery charging apparatus for nickel-cadmium cells in which the charging current is interrupted when the cell reaches the fully charged state.

A further object is the provision of battery charging apparatus which is responsive to the fully charged state of the cell to control the charging current.

Still another object is the provision of a simple, economical system for quickly recharging sealed nickel-cadmium cells to full capacity and which ceases to charge the cell when gas pressure within the cell begins to increase in consequence of overcharge.

A more specific object of the invention is the provision of a battery charging system with a transducer control responsive to internal cell pressure for regulating the charging current.

These objects are achieved with a pressure sensitive transducer which, during the charging cycle, is mechanically connected to the nickel-cadmium cell and electrically connected to the source of charging current to control the latter in response to changes in internal cell pressure. In a preferred embodiment, the cell and a pressure-resistance transducer are axially clamped together in vise-like support during the charging cycle and the transducer is electrically connected to a control circuit which regulates the output of the charger. The transducer senses the internal pressure through the cell casing and when this pressure exceeds a predetermined safe limit, the charger is disconnected from the cell and an appropriate indication that the cell is fully charged is given.

Other objects of the invention will be better understood from the following description of the preferred embodiment thereof; reference being had to the accompanying drawings in which:

FIGURE 1 is a typical current vs. time discharge curve for a nickel-cadmium cell;

FIGURE 2 is a schematic drawing of battery charging apparatus embodying the invention;

FIGURE 3 is an enlarged sectional view of part of the pressure detector block which senses changes in internal pressure of the cell;

FIGURE 4 is a schematic circuit block diagram of a battery charging control circuit useful in the practice of the invention; and FIGURE 5 is a curve showing the relationship between transducer resistance and battery charging time.

A charged nickel-cadmium cell has a positive electrode consisting of nickel hydroxide in the trivalent state which changes to bivalent nickel hydroxide, $Ni(OH)_2$, as the cell is used and discharged. The active material on the negative electrode is cadmium, Cd, which becomes cadmium hydroxide, $Cd(OH)_2$, in the discharged state. The electrolyte is a solution of potassium hydroxide, KOH. Both electrode reactions are reversible and so with an external current input to the cell, the discharge reaction may be driven in reverse until the electrodes are recharged. If charge current is continued after the cell is fully charged, oxygen is produced at the anode and recombines at the cathode, depolarizing it. Hydrogen produced at the cathode similarly reacts at the anode but at an exceptionally slow rate. As a consequence, excess hydrogen accumulates within the sealed cell if the overcharge current exceeds a trickle rate and internal pressure increases.

There is no known simple practical technique of measuring the state of charge of a sealed nickel-cadmium cell. The electrolyte is not accessible, and, even if it were, does not provide a measure of cell charge since there is no significant change in its specific gravity over the cell charge range. Similarly, cell voltage is not a good measure of state of charge because the discharge curve is relatively flat.

This is graphically illustrated in FIGURE 1 wherein 10 represents the discharge curve of a nickel-cadmium cell with A representing the point of full charge and ΔV indicating the minimal difference in cell voltage at the extremes of charge capacity of the cell. ΔV characteristically may be from 0.85 percent to 1.7 percent of the rated cell voltage for the recommended discharge rate. One procedure presently recommended by a cell manufacturer when there is doubt about the state of charge is to give a 14-hour freshening charge at the C/10 rate (C=ampere hour capacity of the cell at a 5-hour rate) or to keep the cell on a trickle charge indefinitely at a C/100 rate.

In accordance with this invention, a technique is provided for controlling the charge current to a sealed cell in direct response to the pressure developed within the cell. Apparatus embodying this invention is shown in FIGURE 2 and comprises a U-shaped support 12 adapted to hold a sealed nickel-cadmium cell C to be charged between integral end flanges 12a and 12b. In the embodiment shown in the drawing, the negative cell terminal N abuts against and makes electrical contact with flange 12a. Positive terminal P of the cell is engaged by a block 14 against which an axial force is applied through plate 16 on a screw 17 threadedly engaged in flange 12b of support 12. Electrical connection of the negative electrode N to the charging circuit is made through flange 12a which is electrically conductive and by terminal 19 on the flange. Similarly, the positive cell electrode P is connected to the charging circuit through part of block 14 and terminal 20 thereon.

The source of charging current for cell C is a battery charger 23 having a direct current output and preferably energized by a suitable source 24 of alternating current. The output of charger 23 is connected to a control unit 25 having output lines 26 and 27 connected to the negative and positive terminals 19 and 20, respectively, associated with support assembly, and another output line 28 connected to a charge-no charge indicator 29. Control unit 25 is also connected by lines 30 and 31 to terminals 32 and 33, respectively, on block 14 in order to provide control of the cell charging current in direct response to gas pressure developed within the cell and transmitted through the cell casing against block 14 as described below.

Block 14 is a laminated structure, see FIGURE 3, comprising an electrically conducting plate 35 having a central projection 36 for engaging the positive electrode of the cell. The remainder of the block 14 is a pressure transducer 38 comprising electrically conducting plates 39 and 40 separated by a pressure sensitive substance 41 whose electrical resistance varies in accordance with applied mechanical pressure. The substance 41 may take the form of a paint composed of a rare earth in the lanthanide series mixed with zirconium tetrachloride and made and sold by Clark Electronics Laboratories, of Palm Springs, Calif. Insulator discs 44 and 45 electrically isolate the transducer from disc 35 and pressure plate 16, respectively.

Control unit 25 comprises a circuit illustrated in FIGURE 4 with a normally closed relay 46 connected to the output of charger 23. Relay 46 is opened by operation of a Schmitt trigger circuit 47 through a driver 48 in response to a control signal on line 49 from a voltage divide network having a fixed resistance $R_1$ and a variable resistance $R_2$. The resistance $R_2$ is that of the transducer substance 41 and this relationship is indicated on the drawing by the broken line between transducer 38 and the resistor. Circuit 47 is directly responsive to the output of the voltage divider network and causes relay 46 to disconnect the output of the battery charger from the cell electrodes when the transducer resistance $R_2$ reaches a value corresponding to the maximum safe internal pressure in the cell. The particular paint substance 41 identified above has an electrical resistance which decreases with an increase in its mechanical stress. Thus the output of the voltage divider network on line 49 decreases as the value of $R_2$ drops in response to the increase in compressive force against block 14 and when the Schmitt trigger threshold on bias level is reached, it triggers the driver 48 and relay 46 is actuated to disconnect the battery charger from cell C.

The apparatus shown in FIGURE 2 illustrates the principle of the invention for recharging a single cell C. The cell is placed in position with its negative electrode N in contact with flange 12a and block 14 is positioned adjacent the opposite end of the cell with projection 36 of plate 35 engaging the positive electrode P. An initial preloading force is applied axially to the cell and block 14 by screw 17 so that the resistance $R_2$ of the pressure sensitive layer 41 is such that the output of the voltage divider on line 49 is a predetermined value as indicated on meter 50. Battery charger is energized by closure of switch S to initiate the charging cycle.

Charger 23 preferably is set to generate a constant current at the maximum level consistent with thermally safe charging limits of the cell in order to minimize the charging time required. As the cell is charged from a state of low charge, indicated at L on curve 10 (FIGURE 1), to substantially full charge at A, the resistance $R_2$ of the transducer substance 41 may decrease slightly as shown in FIGURE 5 from L′ to A′ on curve 52 due to a gradual rise in gas pressure within the cell. When the cell is brought to substantially full charge, further charging causes the cell to become overcharged and brings about the production of excess hydrogen within the cell thereby increasing the internal pressure of the cell. This rise in internal pressure is transmitted through the cell casing to block 14 and is instantly sensed by the transducer 38 so that the resistance $R_2$ rapidly falls as indicated at A′ on curve 52 in FIGURE 5. When this resistance drops below a predetermined value indicated by the broken line X in FIGURE 5, the output of the voltage divider network in the control circuit 25 changes so as to cause battery charger 23 to be disconnected from cell C. This occurrence may be announced through an associated indicator 29 which may audibly, visually, or otherwise indicate that the cell is fully charged.

If the cell C is allowed to remain in the battery charging apparatus after charger 23 has been disconnected by control unit 25, internal cell pressure normally will decrease as the gases are absorbed or otherwise dissipated within the cell by chemical recombination. When this occurs the resistance $R_2$ of the transducer increases until it reaches a value as indicated by the broken line Y in FIGURE 5 at which the battery charger is reconnected through the relay 46 to the cell. The difference between the transducer resistance levels corresponding to lines X and Y in FIGURE 5 is determined by the amount of hysteresis in firing point of the Schmitt trigger 47 in FIGURE 4 and allows reliable cell charging without hunting. Charging of the cell occurs until the internal cell pressure again causes the charger to be disconnected by repetition of the turnoff cycle described above. Such recharging of the fully charged battery is indicated by the curves 53 and 54 in FIGURE 5.

The transducer utilizing the above-described pressure-resistance type paint is particularly advantageous because it is economical, compact, lightweight, rugged, and reliable. While the above-described apparatus comprises a separate external transducer, the invention may be practiced with a transducer permanently affixed internally or externally of the cell casing so as to detect the pressure induced stress on the sealed casing and to control the charging apparatus via appropriate terminals on the casing.

Modifications, changes, and improvements may be made to the above-described embodiment of the invention without departing from the spirit and scope of the invention. For example, invention may be practiced with a bank or battery of nickel-cadmium cells with a pressure responsive transducer associated with each cell and connected to a control circuit for charging source through an OR gate so that the charge on the entire battery is determined by the safe pressure limit of the first fully charged cell. The scope of the invention is therefore defined in the appended claims.

What is claimed is:

1. Apparatus for charging a sealed secondary cell which generates gas within the cell casing during at least part of the charging cycle comprising
   a battery charger having an output connectable to said cell for charging it,
   a control unit for controlling the charger output to the cell,
   a clamp-like support adapted to releasably engage said cell during the charging cycle and having
      a fixed abutment and a pressure plate spaced a fixed distance apart during the charging cycle, and
      a transducer disposed between said abutment and said plate whereby said cell is in series alignment with the abutment and the pressure plate and the transducer during the charging cycle,
   said transducer being connected to said control unit for regulating the output of said charger in response to pressure within the cell casing.

2. Apparatus according to claim 1 in which said abutment has an electrical contact engageable with one terminal of the cell and said transducer includes an electrical contact engageable with the other terminal of the cell,
   said abutment and transducer contacts being connected to the output of said charger.

3. Apparatus according to claim 2 in which said transducer comprises a paint-like substance having an electrical resistance which varies with mechanical stress in the substance, and electrically conductive plates being clampable between said pressure plate and said other cell terminal whereby the electrical resistance of said substance becomes the analog of the internal pressure of the cell.

References Cited

UNITED STATES PATENTS

| | | | |
|---|---|---|---|
| 3,243,682 | 3/1966 | Gold | 320—46 |
| 3,123,758 | 3/1964 | Giacalone | 320—46 X |
| 3,252,071 | 5/1966 | Plessis | 320—46 |
| 3,100,862 | 8/1963 | Collier | 320—46 |
| 3,005,943 | 10/1961 | Jaffe | 320—46 X |
| 3,281,640 | 10/1966 | Mas | 320—46 |

LEE T. HIX, *Primary Examiner.*

S. M. WEINBERG, *Assistant Examiner.*